UNITED STATES PATENT OFFICE.

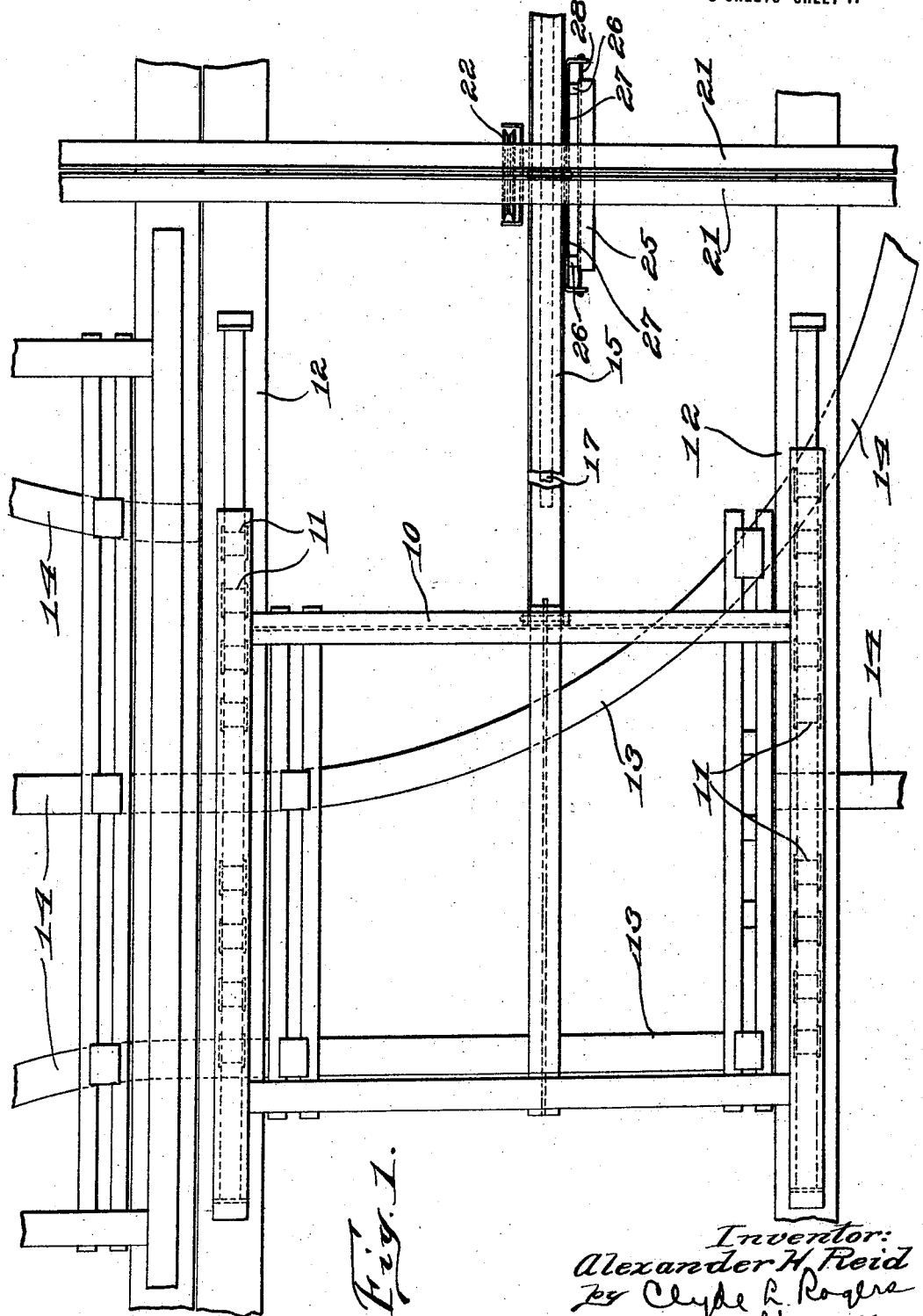

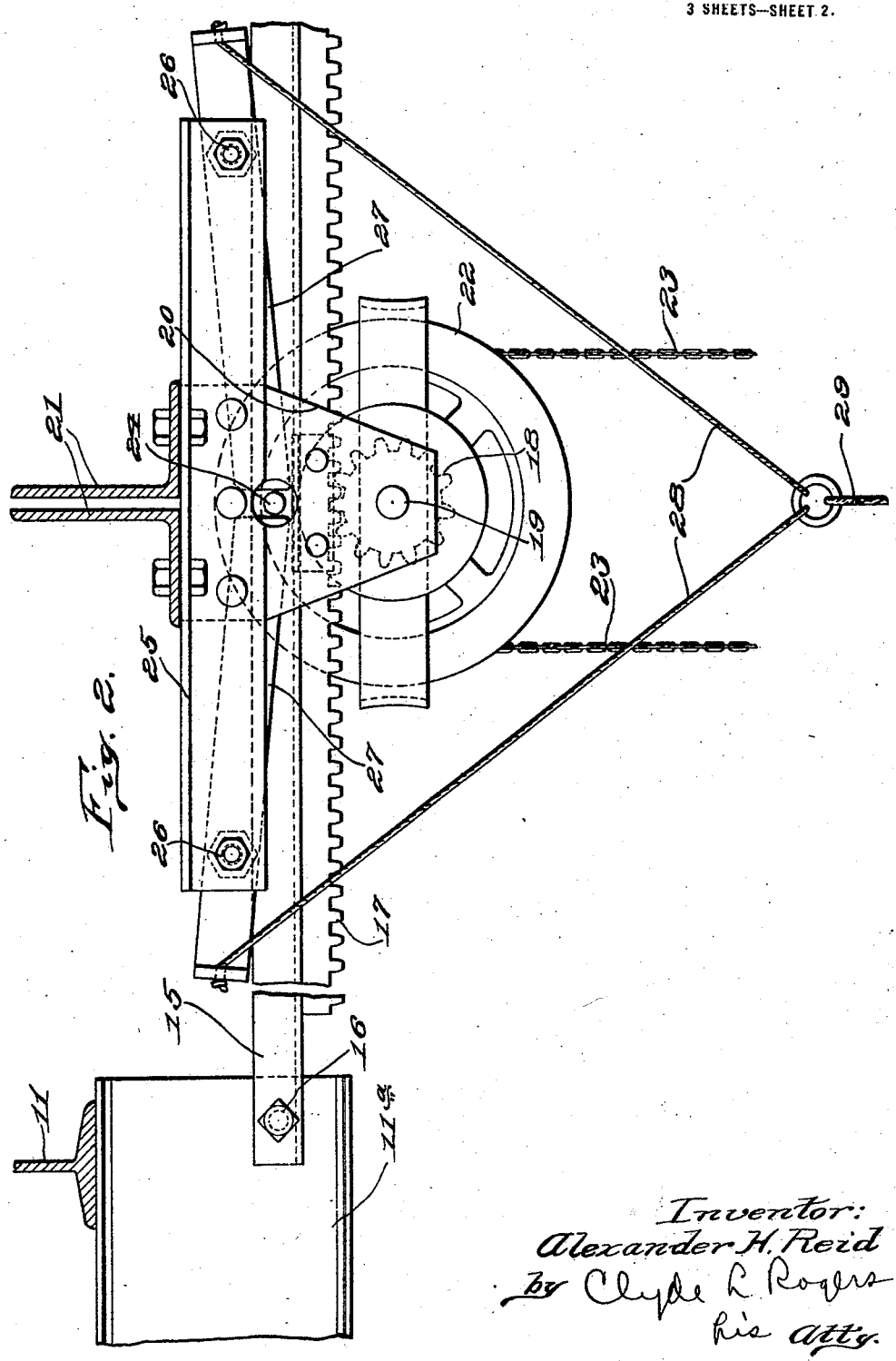

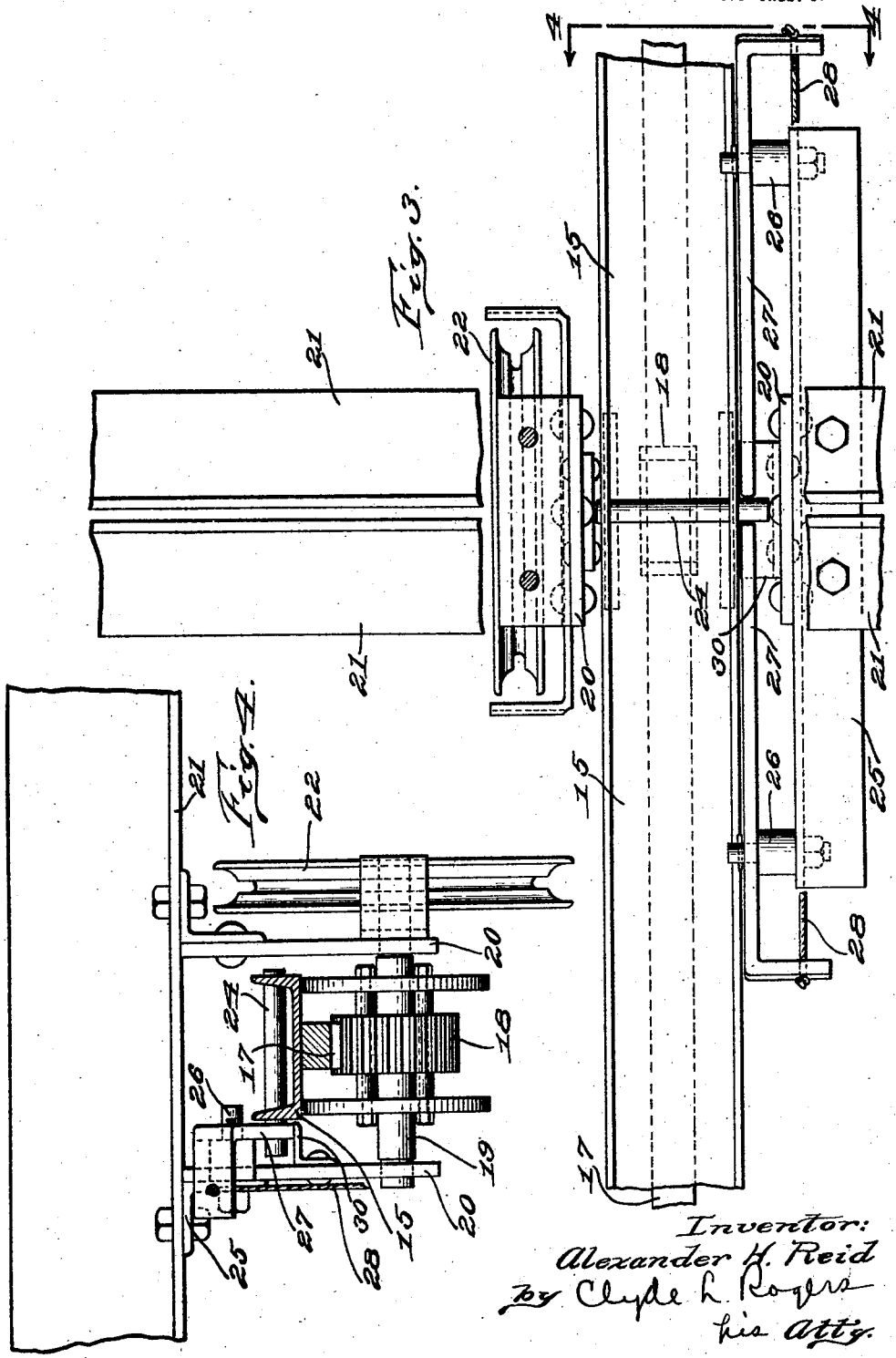

ALEXANDER H. REID, OF CHICOPEE, MASSACHUSETTS, ASSIGNOR TO THE COBURN TROLLEY TRACK MANUFACTURING COMPANY, OF CHICOPEE, MASSACHUSETTS, A CORPORATION OF MASSACHUSETTS.

LOCKING AND OPERATING DEVICE FOR TROLLEY SWITCHES.

1,414,303.     Specification of Letters Patent.     Patented Apr. 25, 1922.

Application filed August 31, 1920. Serial No. 407,174.

*To all whom it may concern:*

Be it known that I, ALEXANDER H. REID, a citizen of the United States, and resident of Chicopee, county of Hampden, Commonwealth of Massachusetts, have invented an Improvement in Locking and Operating Devices for Trolley Switches, of which the following description, in connection with the accompanying drawings, is a specification, like characters on the drawings representing like parts in each of the several views.

This invention relates to track systems comprising overhead trolley tracks of I-beams or the like for the transfer of relatively massive objects and bodies from one part to another of a shop or factory. In track systems of this kind it is customary to provide cars bearing switch track sections for connecting different track portions at will, an apparatus of this kind being shown in the prior Patent No. 1,026,239 to H. E. Ballard patented May 14, 1912. The principal object of the invention is to provide improved means for locking the switch transfer car in a given position where it holds the movable track section borne by it alined with another track section. In accordance with my invention the locking device for this purpose is automatically operable to lock the car securely and immovably when it reaches the desired position, and is equipped with manually operable tripping means capable of instantly releasing the car for movement when required. The foregoing and other objects and advantages of the invention will more fully appear from the following detailed description, and the distinctive features of novelty will be thereafter pointed out in the appended claims.

Referring to the drawings:

Fig. 1 is a plan view showing a part of a track system with a switch track car equipped with the invention;

Fig. 2 is a relatively enlarged partial side view of the locking mechanism, adjacent portions of the car and of the fixed mounting for the lock being shown broken away and in section;

Fig. 3 is a partial top plan view of the locking mechanism of Fig. 2; and

Fig. 4 is a partial transverse sectional view on line 4—4 of Fig. 3.

10 indicates a car having a roller mounting 11 on beam supports 12 which may be secured to the ceiling or overhead structure of the shop. This car bears depending therefrom track sections 13 which are adapted to be selectively brought into register with other track sections 14 borne by the beam supports or by other cars. For holding the car 10 locked so that a track section 13 thereon will be in register with one of the other track sections 14, I provide a bar 15 which may be in the form of a channel iron bolted at one end as indicated at 16 to an intermediate beam 11ª of the car 11. The bar 15 has fixed to its under side a rack 17 which is engaged by a pinion 18 fixed on a short shaft 19. The shaft 19 is journaled in bracket supports 20 depending from beams 21 constituting a part of the fixed overhead frame work. The shaft 19 also has fixed thereon a grooved wheel 22 with which is engaged a chain 23 extending downward for manual operation and constituting means whereby the car may be operated by the rack and pinion connection 17, 18. The bar 15 has secured therein a transverse pin 24 which projects at one side therefrom. The fixed beam support 21 has secured thereto a rail 25 extending a substantial distance to each side of the pin 24 when this is in position where the car is locked. This rail has pivoted adjacent its ends as indicated at 26 lever bars 27, the shorter ends of which extend outward beyond these pivots where they are engaged with pull cords 28 shown as leading downward to a single depending cord or chain 29 for simultaneous actuation by the operative. The other longer portions of these lever bars extend inward toward each other leaving just room enough between their inner ends to receive the pin 24. The inner ends of these bars are adapted to rest normally upon a shelf 30 borne by one of the brackets 20 and when so resting these arms are preferably inclined downward at a small angle as shown in Fig. 2, though this inclined position is not essential. Thus with the parts in the position shown in Fig. 2 the car is locked from movement in either direction since the pin 24 is held immovable between the ends of the two bars 27, this holding a track section 13 borne by the car correctly alined and registering with another track section 14. When it is desired to move the car the cable 29 is pulled downward thus drawing up the inner ends of the lever bars 27 and permitting the pin 24 to move with the car in either direction. As the car is returned from its travel, the pin 24 will ride under one of the bars 27 according to the direction in which it may be moved, gradually lifting said bar until it reaches the locking position when the bar will drop in behind it by gravity, thus locking it from further movement in either direction until the bars are again tripped manually. The present device thus provides exceptionally simple and compact means whereby the car is locked automatically after a predetermined movement in either direction against further movement either in that direction or in the opposite direction until the tripping device is operated and in combination therewith a single tripping device adapted to release the car for movement in either direction. I am aware that the invention may be embodied in other specific forms without departing from the spirit or essential attributes thereof, and I therefore desire the present embodiment to be considered in all respects as illustrative and not restrictive, reference being had to the appended claims rather than to the foregoing description to indicate the scope of the invention.

Having described my invention, what I claim as new and desire to secure by Letters Patent is:

1. Apparatus of the kind described, comprising a car bearing one or more switch sections of trolley track, and means for automatically locking said car when it reaches a predetermined position, such means consisting in a single stop member borne by the car, and devices having a relatively stationary mounting and movable to engage with said stop member at either side thereof, when the car reaches a predetermined position.

2. The combination with a car bearing one or more switch sections of trolley track, of means for automatically locking said car upon reaching a predetermined position in either direction of movement, said means consisting in a single stop member borne by the car, and members mounted on relatively stationary pivots and adapted to engage said stop member at opposite sides thereof when the car reaches a predetermined position to hold the same locked in such position, said members connected together for tripping by a single manually operated element.

3. The combination with a car mounted on an over head support, of locking means therefor comprising a bar projecting from the car bearing a transverse pin, and lever arms pivoted to a relatively stationary mounting having portions extending towards each other adapted to permit said pin to ride thereunder and to then drop in behind the same to lock the car in definite position.

4. The combination with a car mounted on an over head support, of locking means therefor comprising a bar projecting from the car bearing a transverse pin, and lever arms pivoted to a relatively stationary mounting having portions extending towards each other adapted to permit said pin to ride thereunder and to then drop in behind the same to lock the car in definite position, and means for simultaneously engaging said arms to trip the same and release said pin to permit car movement.

5. The combination with a car mounted on an over head support and bearing one or more track sections, of a bar projecting from said car equipped with operating means for moving the car and also bearing a pin projecting transversely therefrom, lever bars pivoted to a relatively stationary support and extending inwards towards each with their inner ends spaced apart to permit entrance of the pin therebetween, and means for simultaneously tripping said bars to release the pin and permit car movement.

In testimony whereof, I have signed my name to this specification.

ALEXANDER H. REID.